Figure 8:
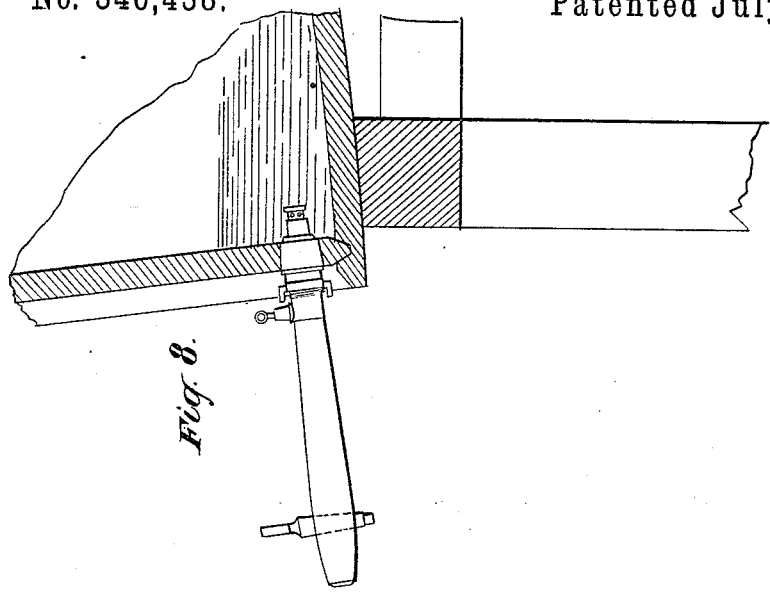

(No Model.)  2 Sheets—Sheet 1.
M. G. GILLETTE & L. KING.
TAP VALVE AND TAP VALVE FAUCET.
No. 346,438.  Patented July 27, 1886.
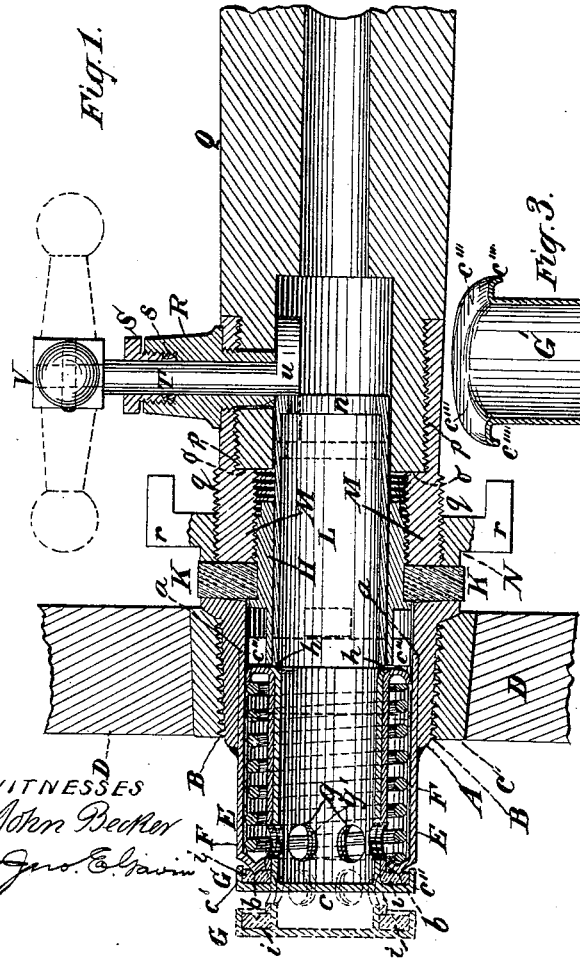
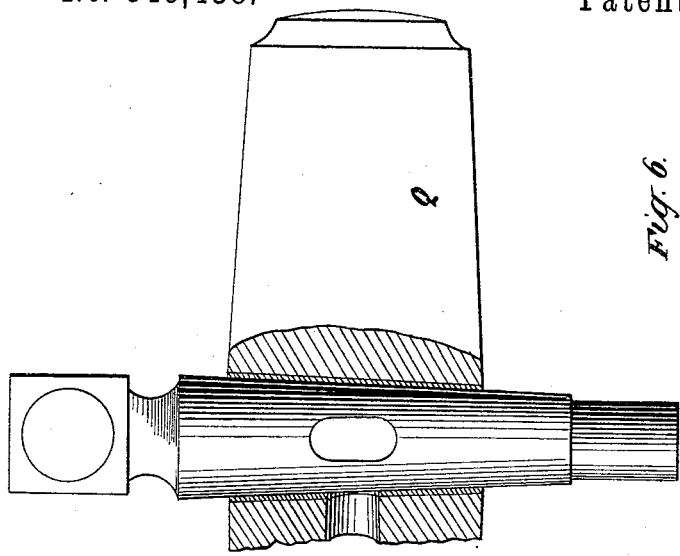
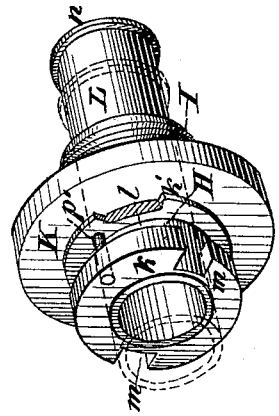
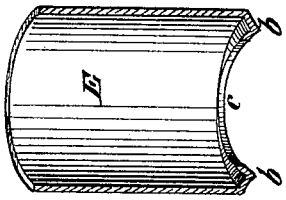
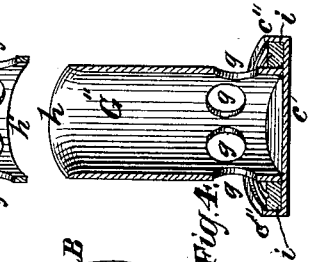
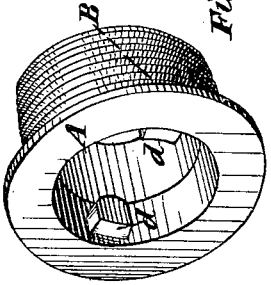
WITNESSES
John Becker
Geo. E. Savin
INVENTORS:
Mott G. Gillette,
Leach King,
by Chas. M. Higgins,
attorney (No Model.) 2 Sheets—Sheet 2.

M. G. GILLETTE & L. KING.
TAP VALVE AND TAP VALVE FAUCET.

No. 346,438. Patented July 27, 1886.

UNITED STATES PATENT OFFICE.

MOTT G. GILLETTE, OF NEW YORK, N. Y., AND LEACH KING, OF NEWARK, NEW JERSEY, ASSIGNORS TO THE EUREKA TAP VALVE COMPANY, OF NEW YORK, N. Y.

TAP-VALVE AND TAP-VALVE FAUCET.

SPECIFICATION forming part of Letters Patent No. 346,438, dated July 27, 1886.

Application filed May 13, 1886. Serial No. 202,020. (No model.)

*To all whom it may concern:*

Be it known that we, MOTT G. GILLETTE, of New York city, county and State of New York, and LEACH KING, of Newark, Essex county, New Jersey, both citizens of the United States, have jointly invented certain new and useful Improvements in Tap-Valves and Tap-Valve Faucets for Liquids, of which the following is a specification.

Our invention relates to tap-valves and tap-valve faucets for liquids of any kind, but more particularly for ale, beer, wine, and other liquids charged by natural fermentation or otherwise with gas.

Hitherto where tap-valves were not used it has been customary for brewers to place in the cellars of retailers from ten to one hundred casks of beer arranged in tiers one above the other. In retailing this beer the retailer inserts a faucet into the tap-hole by driving the stem into the cask, after which it is joined by a coupling to the lead pipe extending from and connecting with a pump in a salesroom above the cellar. After one cask is completely emptied the faucet or attachment is disconnected and inserted into another cask, and although retailers are requested to plug the holes when the faucets are extracted, in order to prevent the access of the damp moldy air of the cellar to the interior of the casks, they are in general, and it may be said almost uniformly, neglectful of this precaution, and the apertures into the interior of the cask being left open the foul damp air of the cellar enters and the casks become moldy, the germs in the mold penetrating into the pores of the wood, and the casks are so permeated with these germs and tainted thereby that they are rendered valueless and unfit for further use, it being impossible by any means known to thoroughly purify them either by fumigation or by the use of chemical liquids. A great expense is thus entailed, resulting in great loss to brewers. To obviate this tap-valves have been invented, having for their object to automatically close the tap-hole whenever the cask is disconnected from the pump, or whenever the faucet is withdrawn therefrom. There have been, however, many difficulties in the application of tap-valves, resulting, chiefly, from the imperfect character of their construction. In the first place it has been difficult to make them sufficiently cheap. There has also been difficulty in packing them so that they will close air-tight, and that all the joints made with them in establishing the connection between the casks and the pumps shall also be air-tight. There has also been difficulty in so constructing them that their operation shall be certain.

A perfect tap-valve should have the following qualifications: It should automatically exclude the air from the interior of the cask when the faucet is withdrawn or a disconnection made from the pumps, and it should also be capable of being connected with perfect tightness to the cask, so that no air can enter the cask, except through the vent-valve during the act of drawing the beer. It should also dispense entirely with the wooden tap-plug or cork, thus saving the cost of the same. Moreover, the ordinary tap-hole becomes enlarged by constant usage, necessitating the removal of a portion of the head of the cask in which the tap-hole is bored one or more times during the life of the cask, thus entailing considerable trouble and expense.

A perfect tap-valve should be constructed in such manner that it can be put into the cask once for all and remain there as long as the cask is used. It should, moreover, permit the connection of a faucet or of a conducting-pipe, which connects the cask to the pumps before the valve is opened, thus preventing any spurting or loss of beer.

All tap-valves which, by inserting the faucet or by making connection with the beer-pump open the tap-valve, are subject to the objection that the beer will spurt before the faucet can be fully inserted or the connection with the pumps completely established. Lastly, the establishing of the connection between the tap-valve and the lead pipe which leads to the pumps, or the connection of the faucet to the valve, should be capable of being made with great facility, and with accuracy and certainty.

It is the object of our invention to provide for these requirements in a tap-valve.

The invention consists partly in certain constructions, whereby the tap-valve is rendered capable of being made by machinery and produced at small cost.

It also consists in a novel method of attaching the faucet or lead-pipe connection, which connects the valve with the beer-pumps, with ease and certainty, making the connection perfectly air-tight without opening the tap-valve.

It also consists in certain constructions whereby, after the connection is made, the tap-valve may be opened, and when so opened the connection of the lead pipe which leads to the pump, or of the faucet with the tap-valve, cannot be broken without permitting the tap-valve to automatically and instantly close, instead of, as hitherto, being both opened when the connection is made and closing when said connection is broken. This feature of allowing the tap-valve to remain closed upon its seat while the connection is being established between the lead pipe and the valve, or to the faucet, through which the beer is to subsequently drawn, prevents any possible waste of beer while tapping the cask. No spurting can ensue. When the connection is thus established, a single movement of the hand is sufficient to open the valve, and it will thus remain open until it is either closed by reversing such movement or by breaking the connection between the pipe and faucet.

Figure 7:
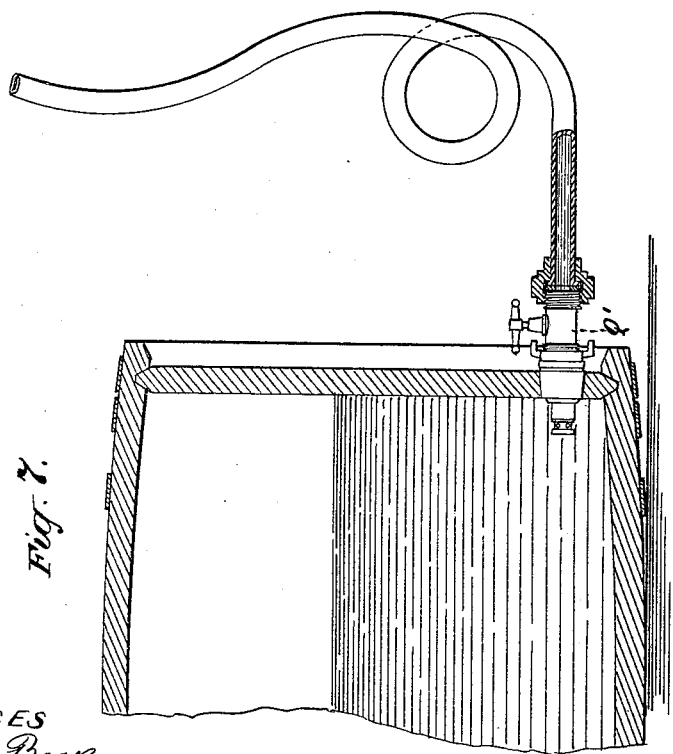

In the drawings, Figure 1 is a sectional view of the portion of a head of a cask in which our improved tap-valve is inserted, and is also a sectional view of a faucet connected therewith, the position of the parts in full outline being that in which the tap-valve is closed fully upon its seat, the position of the parts indicated by dotted outline being that which is assumed when the tap-valve is open subsequently to making the connection for the purpose of drawing the beer from the cask. Figs. 2, 3, 4, 5, and 6 are respectively detail views showing parts of the construction. Fig. 7 is a partial sectional view of a cask having our improved tap-valve inserted into the head of the same, and connected with the pipe which leads to a pump above. Fig. 8 is also a partial sectional view of a cask in which our improved tap-valve is inserted, the same being connected in this instance with a faucet for drawing the beer from the cask.

A, Figs. 1 and 2, is a metallic bush, which has upon it a tapered screw or parallel thread, B, for insertion into the wooden bush or bung C. When provided with a screw-thread, it may be screwed into such bush or bung, and the latter may be tightened down upon the same by driving it into the head of the cask D, Fig. 1; or the bush A may be inserted in any other suitable or preferred manner. The inside of the metal bush A is bored out for a certain distance at the end of the same, which enters the cask in such a manner as to leave a shoulder, $a$, Fig. 1, and to permit a valve-seat, E, to enter into said bush and abut against the shoulder $a$.

The valve-seat E is manufactured in the following manner: First, a disk is punched from sheet-brass or from any metal suitable for forming said seat; next, by the action of a suitable press, this disk is formed into a cylindrical cup with parallel sides; then, by means of a press and suitable dies, a ridge or obtuse angular edge, $b$, is formed on the bottom or closed end of said cup, and, lastly, the center of the bottom is punched out to leave a circular opening of a specific size within the annular ridge or obtuse edge $b$, as shown at $c$ in Fig. 5. The valve-seat so formed is then inserted into the bored-out portion of the metallic bush until it abuts against the shoulder $a$, and the two parts are then brazed or soldered together. A stout coil-spring, F, of a diameter adapted to the diameter of the cylindrical part of the valve-seat E, is also made of any suitable material—say brass or German silver—and is fitted into said cylindrical part. This spring is of such dimensions as to exert a pressure, when inserted as described, and held in its position as hereinafter described, of sixty pounds to the square inch, or thereabout. The valve G is also of peculiar construction. It is made of two parts, G' and G'', as shown in Figs. 3 and 4. The part G'' consists of a disk, $c'$, with an upturned rim like the cover of a cup or box, as shown at $c''$ in Figs. 1 and 4. Concentrically with the top of the disk $c'$ and the rim $c''$ is attached to said disk for soldering or brazing a short tube, G'''. Near the end of said tube G''' are formed a series of holes, $g$, at equal distances entirely around the tube, their centers being as nearly as practicable in the same plane of cross-section. The end of the short tube G''' which lies opposite the disk $c'$, is chamfered out, as shown at $h$ in Fig. 4. The part G' of the valve is formed as shown in Fig. 3. It also is a short tube, the total length of which is slightly less than the total length of the tube G''', and the internal diameter of which is equal to the external diameter of the tube G''', so that when the tube G''' is inserted internally into the tube G' the chamfered margin $h$ of the end of the tube G''' shall project a little beyond the end of the tube G'. At one end of the tube G''' is formed a projecting rim, $c'''$, the outer edge of which is turned inwardly toward the top of the tube G' to some extent, as shown at $c''''$ in Fig. 3. Near the end of the tube G', opposite the rim $c'''$, is formed a series of holes, $g'$, these holes being so spaced and so arranged with reference to the end of the tube G' that when the tube G''' is inserted into the interior of the tube G' and turned properly the holes $g'$ in the tube G' will be exactly superimposed over the holes $g$ in the tube G''', and form continuous passages from the interior of the tube G''' through and to the exterior of the tube G'.

In the annular space between the upturned rim $c''$, Fig. 4, and the body of the tube G''', is fitted a packing of leather or any other suitable composition having the proper degree of durability and elasticity, as shown at $i$ in Fig.

4, and when the tube G″ is inserted into the interior of the tube G′ the margin of the end of the tube G′, which is shown at h′ in Fig. 3, bears upon the margin of the packing i, and when forced down upon the same, and the parts are attached together, as hereinafter described, forms a perfectly air-tight joint. The parts of the valve being constructed as described, and the spring F having been made and fitted into the valve seat E, as described, the tube G′ is inserted into the outer end of the bush A and slid down through the same into the valve-seat E in such manner as to inclose the spring and form with the cylindrical part of the valve-seat E an annular cylindrical and inclosed space, which confines said spring and holds it always in proper relation with the valve-seat. Next the tube G″ is inserted into the tube G′ from the inner end thereof, as shown in Fig. 1, and so turned that the holes g therein are brought in exact relation with the holes g′ in the tube G′ as hereinbefore described. The chamfered-off margin h of the end of the tube G″, which then slightly projects beyond the rim c″ of the tube G′, is then bent and extended outwardly to overlap and embrace the inner angle of the rim c″, and is brazed or soldered thereto. The valve G, thus made up and constructed, becomes thus permanently fitted within the cylindrical part of the valve-seat E, and the action of the spring causes the annular packing i to bear firmly down upon the annular edge or ridge b of the valve-seat E, hereinbefore described.

In the interior of the bush A, near the outer end thereof, are formed two interiorly-projecting and diametrically-opposite lugs, d. These are for the engagement of mechanism whereby the valve-seat G is opened, which I will now proceed to describe. This mechanism is shown in Figs. 1 and 6. A short tube, H, is threaded at one end, as shown at I, and has formed upon the opposite end flanges k and k′, the space l between said flanges k and k′ being turned down to a considerably smaller diameter than the threaded portion I. In the periphery of the flange k are formed two rectangular and diametrically-opposite notches, m, which notches allow the flange k of the tube H to pass into the outer end of the bush A, past the internally-projecting lugs d, and by turning upon its longitudinal axis to engage the bush by the unnotched portion of said flange k upon said lugs, a stop, preferably a pin, p′, Figs. 1 and 6, inserted into the flanges k and k′, limiting the motion required for making such engagement. The diameter of the flange k corresponds quite accurately to the diameter of the interior of the unbored part of the bush A, Fig. 2. The diameter of the flange k′ is the same or nearly the same as that of the flange k, and the threaded part I may extend entirely to the flange k′, or it may cease a short distance therefrom, if preferred. The washer K, of leather or other material having sufficient rigidity, impermeability, and elasticity, and having its inner diameter of a size which will permit it to pass snugly over the threaded part I, or to be screwed over the same flush against the flange k′, is placed upon the tube H, as shown in Figs. 1 and 6. This washer has an exterior diameter slightly greater than that of the bush A, and in use it abuts against the outer end of said bush, as shown in Fig. 1, and is tightly clamped against it, as will be hereinafter described, such bush being preferably beveled inwardly on its outer face, as indicated in Fig. 1, in order that the tendency of the washer will be to press inwardly toward the tube H, instead of squeezing out between the bearing-surfaces. Into the interior of the tube H is fitted a short sliding tube, L, re-enforced at one end, as shown at n, the use of which tube will be hereinafter described.

In use there is fitted to the threaded part I of the tube H a female-threaded ferrule, M, Fig. 1, which has a shoulder at o and a female threaded screw portion at p of larger internal diameter than the female-threaded part M. Exteriorly to the female screw-threaded part M is formed a male thread, q, and upon this male thread q is fitted neatly a thumb-nut, N, having thumb-pieces r. The diameter of the male-threaded portion q of the ferrule M is considerably smaller than the external diameter of the washer K, and the thumb nut N has a face formed on the side toward the washer, which in use compresses the margin of the washer K firmly against the outer margin of the bush A, thus making a hermetically-sealed joint. The ferrule M is fitted by its female-threaded portion p either to the body of a faucet, Q, or to the body of a coupling, Q′, Fig. 7, which is a modification of the faucet, which will be hereinafter described. At right angles with the body of the ferrule M is fitted into the part p of the same a nipple, R, provided with a screw-threaded gland, S, which fits into a stuffing-box, s, formed in said nipple. The threaded part of the nipple R, which is inserted into the body of the valve M, is tapered and screwed in so as to make a perfect fit. Through the gland S, stuffing-box s, and nipple R is passed a stem, T, which has on its inner end an eccentric, u, and to the outwardly-projecting end of the stem T is fastened a cross-handle, V. Now, the tube L, Figs. 1 and 6, which was described as fitting loosely and sliding in the tube H, is of such length that when the valve G is forced down upon the annular ridge or obtuse edge b of the seat E, as shown in Fig. 1, by the action of the spring F, it quite accurately fills the space between the rim c‴ on the inner end of the valve and the stem T, which has formed upon its inner end the eccentric u, one end of the tube L bearing against the rim c‴, and the re enforced end n of said tube bearing against the stem T when the eccentric is in the position shown in Fig. 1. It will be evident that when the tube H is screwed into the valve M, as shown in Fig. 1, the faucet Q, valve M, and tube H may all be attached to the tap-valve bush A by passing the flange $k$ into the end of the bush in such manner that the notches $m$ in said flange will allow the flange to pass to the rear of the lugs $d$, Fig. 2, in the bush, and then, by giving the body of the faucet a quarter-turn on its longitudinal axis, the unnotched parts of the flange $k$ will engage with the lugs $d$ and hold the faucet attached to the bush. When this is done, the thumb-nut $r$ may be screwed up firmly against the washer K, and thus form a perfectly tight and rigid attachment of the faucet, ferrule, and tube H to said bush, and this will be done without opening the valve G in the slightest degree. Therefore during this attachment it is impossible for any of the liquid in the cask to spurt out. When the attachment has thus been firmly made, and it is desired to draw liquid from the cask, a single quarter-turn of the valve-stem T causes the eccentric to press the sliding tube L against the inner end of the valve at $c'''$, Fig. 1, and to open it into the position shown in dotted outline in said figure. The liquid thus flows at once into the body of the faucet, and from thence can be drawn as desired.

In Fig. 7 a modification of the invention is shown which is designed to permit the attachment of the coupling of a lead pipe leading to a beer-pump, with the tap valve constructed as already described. The only difference between this and the faucet shown in Fig. 1, is that at Q the body of the ferrule M is extended somewhat outward beyond the nipple R, and has an exterior screw-thread for the attachment of the pipe-coupling thread; also, the interior female screw-thread, $p$, is in this case omitted. The parts are in every other respect exactly similar to those already described, and their operation is identically the same.

Fig. 8 illustrates the attachment of a faucet to a cask as when in use, and needs no detailed description.

Having thus described our invention, what we claim as new, and desire to secure by Letters Patent, is as follows:

1. In a tap-valve, the valve G, constructed, substantially as herein described, of two parts, G' and G'', the part G' being substantially a tube having a rim, $c'''$, the outer edge of which is turned inwardly toward the body of the tube, and having near the end opposite the rim $c'''$ openings or holes $g'$, and the part G being also substantially a tube having at one end an attached disk, $c'$, with upturned rim $c''$, leaving an annular space between the body of the tube and the rim $c'$ for the insertion of the annular packing $i$, and having near said disk $c$ the openings $g$, the external diameter of the tube G'' being the same as the external diameter of the tube G', and the total length of the tube G' being such that when the tube G'' is slid into the interior of the tube G' the edge $h'$ of the tube G will bear upon the inner margin of the annular packing $i$, the openings $g'$ in the tube G' will be superimposed over the openings $g$ in the tube G'', and the upper extremity of the tube $g''$ will protrude slightly above the rim $c''$ of the part G', the said two parts when thus put together being joined by turning down the upper extremity, $h$, of the tube G'' upon the rim $c''$ of the tube G', substantially as and for the purpose herein set forth.

2. The combination of the bush A, cylindrical valve-seat E, fitted and attached to said bush, the valve G, fitted to pass through and work in the opening $c$ of the valve-seat E, and having the outwardly-turned rim $c'''$, said valve and valve-seat when connected together, substantially as herein described, forming an annular chamber for the reception and retention of a spring, F, substantially as herein described.

3. The combination of a tap-valve bush, A, having formed on its interior the inwardly-projecting lugs $d$, near the outer face of said bush, the tube H, having formed thereon the notched flange $k$, the flange $k'$, and the threaded part I, the ferrule M, having a female thread fitted to the male-threaded part of the tube H, and having also a screw-thread for engaging the body of the faucet or coupling of pipe which leads from the tap-valve to a pump, and a washer, K, fitted to be engaged between the outer face of said tap-valve bush and the end of the ferrule M, which screws upon the threaded part of the tube H, said washer being for packing the joint between said ferrule and tap-valve bush when the notched flange of the tube H is inserted into the outer end of the bush A and engaged with the lugs $d$, substantially as and for the purpose set forth.

4. The combination of a tap-valve bush, A, having formed on its interior inwardly-projecting lugs $d$, near the outer face of said bush, the tube H, having formed thereon the notched flange $k$, the flange $k'$, and the threaded part I, a ferrule, M, having a female thread fitted to the male-threaded part of the tube H, and having also a screw-thread for engaging the tube of a faucet or coupling of pipe which leads from the tap-valve to a pump, a washer, K, fitted to the tube H between the outer face of said bush and the end of the ferrule which screws upon the tube H, and a thumb-nut, M, screwed upon the exterior male thread on the ferrule M in such manner that it can be tightened down upon the outer margin of the washer K, for more securely and firmly packing the joint between said valve and bush, substantially as and for the purposes herein specified.

5. The combination of the valve-seat E, attached to the bush A, the valve G, sliding within said valve-seat and bush, the spring F, inclosed and retained between said valve and valve-seat for holding the valve down upon said valve-seat, the tube H, for the attachment of the faucet or coupling to the tap-valve bush, the sliding tube L, fitted to slide internally in the interior of the tube H, one end of said tube bearing against the outwardly-turned flange c'' of the valve G, and the cam u, arranged in relation with the end of the tube L, which does not bear against the valve G, in such manner that when the cam is turned it may force the valve G longitudinally toward the inner part of the cask against the action of the spring F, for opening said valve, or contrariwise, substantially as and for the purposes herein set forth.

6. The combination of the valve-seat E, attached to the bush A, the valve G, sliding within said valve-seat and bush, the spring F, inclosed and retained between said valve and valve-seat for holding the valve down upon said valve-seat, the tube H, for the attachment of the faucet or coupling to the tap-valve bush, the sliding tube L, fitted to slide internally in the interior of the tube H, one end of said tube bearing against the outwardly-turned flange c''' of the valve G, the cam u, arranged in relation with the end of the tube L, which does not bear against the valve G, in such manner that when the cam is turned it may force the valve G longitudinally toward the inner part of the cask against the action of the spring F for opening said valve, or contrariwise, the stem T, attached to the cam u, nipple R, having therein the stuffing-box s and fitted to the threaded gland S, and a cross-handle, V, for actuating the cam u in opening the valve or permitting the valve to close, substantially as and for the purpose herein set forth.

7. The combination of the tap-valve composed of the bush A, valve G, valve-seat E, and spring F, all constructed substantially as herein described, the bush A having in the interior lugs d near its outer face, the tube H, having thereon the notched flange k, for engaging said lugs and the male screw-thread I, a valve, M, fitted to screw upon the threaded portion of the tube H, and having a threaded portion for the attachment of a faucet or pipe-coupling, the cam u, pivoted to said valve, the sliding tube L, between said cam and the valve G, for actuating said valve, substantially as herein described, and a faucet or pipe-coupling, Q or Q', attached to said valve in the manner herein described, whereby said faucet or pipe-coupling, valve-tube H, and sliding tube L may act by turning them slightly upon their longitudinal axis to release the notched flange from engagement with the bush A, thereby permitting the spring F immediately to act and instantly to close the valve G upon the seat E, substantially as herein described, and for the purposes set forth.

8. The combination of the tube H, having formed thereon the notched flange k, flange k', and screw-thread I, the ferrule M, having formed therein a female thread for engaging the threaded portion I of the tube H, the bush A, having formed therein the internally-projecting lugs d, and a stop, p', for limiting the motion of said tube H upon its longitudinal axis in engaging the bush A, substantially as herein described, and for the purposes set forth.

MOTT G. GILLETTE.
     LEACH KING.

Witnesses:
 JNO. E. GAVIN,
 LEICESTER ALLEN.